United States Patent [19]

Bowman et al.

[11] Patent Number: 4,498,927
[45] Date of Patent: Feb. 12, 1985

[54] THERMAL REDUCTION PROCESS FOR PRODUCTION OF MAGNESIUM USING ALUMINUM SKIM AS A REDUCTANT

[75] Inventors: Kenneth A. Bowman, Leechburg, Pa.; Roy A. Christini; Marlyn D. Ballain, both of Colville, Wash.

[73] Assignee: Aluminum Company of America, Pittsburgh, Pa.

[21] Appl. No.: 474,738

[22] Filed: Mar. 10, 1983

[51] Int. Cl.³ ............................................. C22B 26/22
[52] U.S. Cl. .................................... 75/67 R; 75/10 A
[58] Field of Search .................. 75/67 R, 67 A, 10 A

[56] References Cited

U.S. PATENT DOCUMENTS

| | | | |
|---|---|---|---|
| 2,330,143 | 9/1943 | Pidgeon | 75/67 R |
| 2,448,000 | 8/1948 | Kemmer | 75/67 R |
| 2,971,833 | 2/1961 | Artru et al. | 75/10 R |
| 3,579,326 | 5/1971 | Avery | 75/67 R |
| 3,658,509 | 4/1972 | Avery | 75/67 R |
| 3,681,053 | 8/1972 | Avery | 75/67 R |
| 3,698,888 | 10/1972 | Avery | 75/67 R |
| 3,761,247 | 9/1973 | Avery | 75/67 R |
| 3,782,922 | 1/1974 | Avery | 75/67 R |
| 3,994,717 | 11/1976 | Avery | 75/67 R |
| 4,033,758 | 7/1977 | Johnston et al. | 75/67 R |
| 4,033,759 | 7/1977 | Johnston et al. | 75/67 R |
| 4,066,445 | 1/1978 | Johnston et al. | 75/67 R |

Primary Examiner—M. J. Andrews
Attorney, Agent, or Firm—Brian D. Smith

[57] ABSTRACT

Magnesium is produced by a thermal reduction process in a reaction-condensation system having a reaction zone and a condensation zone. According to this process, a reducing agent containing a mixture of ferrosilicon and at least 25 wt. % aluminum skim is contacted or reacted in the reaction zone with a calcium-silicon-aluminum-magnesium oxide slag to produce magnesium vapor. The magnesium vapor is transported from the reaction zone to the condensation zone and condensed therein.

31 Claims, 2 Drawing Figures

SLAG COMPOSITION
5 WEIGHT PERCENT MgO

THERMAL REDUCTION PROCESS FOR PRODUCTION OF MAGNESIUM USING ALUMINUM SKIM AS A REDUCTANT

BACKGROUND OF THE INVENTION

The present invention relates to the production of magnesium by the thermal reduction of magnesium oxide in the presence of a molten oxide slag. More particularly, this invention relates to the production of magnesium by contacting or reacting a metallic reducing agent with a molten calcium-silicon-aluminum-magnesium oxide slag or with magnesium oxide in the presence of such slag.

Several processes for the production of magnesium by thermal reduction are known. These processes generally operate to react magnesium oxide with a metallic reducing agent such as silicon, aluminum, calcium or mixtures or alloys thereof. The reaction may take place in the solid state or in the liquid state.

The Pidgeon Process, described in U.S. Pat. No. 2,330,143, is a well-known solid state reaction process for the production of magnesium. In carrying out this process, a magnesium oxide ore, such as calcined dolomite, and ferrosilicon are formed into briquettes and charged to a gas-fired or electrically heated retort having a reaction zone and a water-cooled condensation zone. The retort is evacuated and heated so that the temperature in the reaction zone is about 1150° C. Typically, the pressure in the reaction zone is less than 1 torr. Under these conditions, the ferrosilicon reacts with the magnesium oxide ore to produce magnesium vapor. The vapor so produced is conducted to the condensation zone, where it is condensed as a solid.

Another thermal reduction process utilizing a solid state reaction is described in U.S. Pat. No. 2,448,000 of Kemmer. This process is similar to the Pidgeon Process, but it utilizes aluminum as the reducing agent, and it also requires the addition of a moderating agent to the reaction zone. This moderating agent consists of aluminum nitride, a mixture of aluminum nitride, aluminum carbide and aluminum oxide or a mixture of ferrosilicon, aluminum nitride, aluminum carbide and aluminum oxide. In one embodiment of this process, there is used as a combined reducing agent and moderating agent "the dross which is obtained in melting and subsequently casting aluminum or aluminum alloys", provided that the dross contains about 0.5 to 10% by weight aluminum nitride.

A thermal reduction process for the production of magnesium by a liquid state reaction is described in U.S. Pat. No. 2,971,833. This process, called the Magnetherm Process, includes a reaction between a metallic reducing agent and magnesium oxide in the presence of a liquid mixture of oxides in a reaction zone which is heated by the electrical resistance of the mixture of oxides. In carrying out this process, a magnesium oxide ore, such as calcined dolomite, and a reducing agent comprised of silicon, ferrosilicon or an alloy of aluminum and ferrosilicon are charged to the reaction zone of a reaction-condensation system. Aluminum oxide is also added to the reaction zone and the composition of the total charge is controlled so that a particular liquid slag, a mixture of oxides of calcium, silicon, aluminum and magnesium, is formed and maintained in the reaction zone. The composition of the slag is controlled so that the molecular ratio of CaO to $SiO_2$ is at least 1.8 (i.e., weight ratio is 1.68) and the molecular ratio of $Al_2O_3$ to $SiO_2$ is at least 0.26 (i.e., weight ratio is 0.44). The reaction is carried out at a temperature within the range of 1300° to 1700° C. and at a pressure of at least 1.5 torr. Preferably, the Magnetherm Process is operated at a pressure within the range of 5 to 20 torr. Under these conditions, the metallic reducing agent reacts with the calcium-silicon-aluminum-magnesium oxide slag, or with magnesium oxide in the presence of the slag to produce magnesium vapor. The vapor is conducted to the condensation zone where it is condensed as either a liquid or a solid.

Since the development of the Magnetherm Process, several thermal reduction processes for the production of magnesium by a liquid state reaction have been proposed. Like the Magnetherm Process, these processes include the use of a metallic reducing agent, and they require that the composition of the molten oxide slag in the reaction zone be controlled within prescribed limits. These processes operate under various temperature and pressure conditions. They utilize various reducing agents, and most of them require the addition of additives, such as aluminum oxide, to the reaction zone to achieve a liquid state reaction in the presence of a molten oxide slag of controlled composition.

Several of the more recent thermal reduction processes require that the liquid state reaction be carried out under a considerably higher absolute pressure than that of the Magnetherm Process. Thus, for example, U.S. Pat. No. 4,033,759 of Johnston et al. describes a process in which the reaction is carried out under a system pressure within the range of 0.5 to 2 atmospheres (380 to 1520 torr). Several of the processes described in the U.S. patents of Avery require the maintenance of an inert gas in the reaction zone of the reaction-condensation system to provide the desired pressure conditions. For example, the process of U.S. Pat. No. 3,658,509 of Avery requires the maintenance in the reaction zone of an inert gas at a partial pressure within the range of 0.1 to 5 atmospheres (76 to 3800 torr). Avery's U.S. Pat. No. 3,698,888 describes a process which is carried out in the presence of an inert gas at a partial pressure within the range of 0.25 to 2 atmospheres (190 to 1520 torr).

A variety of slag compositions have been used in recent thermal reduction processes for the production of magnesium by a liquid state reaction. Most of the processes of Avery reportedly may be carried out in the presence of molten slags having broad compositional ranges. Thus, for example, Avery's U.S. Pat. No. 3,761,247 describes a process which may be carried out in the presence of a molten slag containing 0 to 70% by weight calcium oxide, 0 to 25% by weight aluminum oxide, 5 to 30% by weight magnesium oxide and 25 to 50% by weight silicon dioxide. Avery's U.S. Pat. Nos. 3,658,509, 3,681,053, 3,698,888 and 3,994,717 also describe processes which may be carried out in the presence of molten slags having broad compositional ranges. The slag described in U.S. Pat. No. 3,658,509 contains 10 to 60% by weight calcium oxide, 10 to 35% by weight aluminum oxide, 5 to 25% by weight magnesium oxide and 20 to 50% by weight silicon dioxide. The slag described in U.S. Pat. No. 3,681,053 contains 10 to 60% by weight calcium oxide, 0 to 35% by weight aluminum oxide, 3 to 25% by weight magnesium oxide and 20 to 50% by weight silicon dioxide. The slag of U.S. Pat. No. 3,994,717 has the same compositional ranges as that of U.S. Pat. No. 3,681,053, except that the slag may contain 2 to 25% by weight magnesium oxide.

The slag of U.S. Pat. No. 3,698,888 contains 0 to 65% by weight calcium oxide, 0 to 25% by weight aluminum oxide, 5 to 30% by weight magnesium oxide and 30 to 50% by weight silicon dioxide.

Several of the recent processes may be carried out in the presence of molten slags having relatively high concentrations of silicon dioxide. All of the processes of Avery mentioned in the preceding paragraph may be carried out in the presence of slags which contain up to 50% by weight silicon dioxide. In addition, Avery's U.S. Pat. No. 3,579,326 describes a process which may be carried out in the presence of a slag which contains a relatively high percentage of silicon dioxide and a relatively low percentage of calcium oxide. This slag contains 0 to 30% by weight calcium oxide, 15 to 35% by weight aluminum oxide, 5 to 25% by weight magnesium oxide and 25 to 50% by weight silicon dioxide.

Several of the recent processes are carried out in the presence of molten slags having relatively low concentrations of silicon dioxide. The slags which have relatively low concentrations of silicon dioxide usually have relatively high concentrations of aluminum oxide. For example, U.S. Pat. No. 3,782,922 of Avery describes a process which may be carried out in the presence of a slag containing 35 to 55% by weight calcium oxide, 35 to 65% by weight aluminum oxide, less than 5% by weight magnesium oxide and 0 to 10% by weight silicon dioxide. The U.S. patents of Johnston et al. also describe processes which are carried out in the presence of molten slags having relatively low concentrations of silicon dioxide. Thus, U.S. Pat. No. 4,033,758 describes a slag containing 42 to 65% by weight calcium oxide, 11 to 38% by weight aluminum oxide, 1 to 11% by weight magnesium oxide and 5 to 19% by weight silicon dioxide. U.S. Pat. No. 4,033,759 describes a slag containing 30 to 65% by weight calcium oxide, 28 to 64% by weight aluminum oxide, 6 to 13% by weight magnesium oxide and less than 5% by weight silicon dioxide. The slag of U.S. Pat. No. 4,066,445 has the same compositional ranges as that of U.S. Pat. No. 4,033,759, except that the slag may contain 6 to 16% by weight magnesium oxide.

A variety of metallic reducing agents have been utilized in thermal reduction processes for the production of magnesium by a liquid state reaction. Many of these processes utilize reducing agents containing a significant amount of silicon. Some utilize silicon-rich alloys of aluminum and silicon or aluminum and ferrosilicon. Thus, for example, U.S. Pat. No. 3,681,053 of Avery describes a process which uses as a reducing agent an alloy containing about 80 to 99.75% by weight silicon, 0 to 20% by weight aluminum and 0.25 to 10% by weight iron. U.S. Pat. No. 3,579,326 of Avery describes a use as a reducing agent of an alloy containing 40 to 65% by weight silicon, 25 to 50% by weight aluminum and 0 to 20% by weight iron. Essentially the same reducing agent is used in the processes of Avery's U.S. Pat. No. 3,658,509. Avery's U.S. Pat. No. 3,994,717 discloses the use of a reducing agent having a composition similar to that described in Avery's U.S. Pat. No. 3,579,326. U.S. Pat. No. 3,994,717 additionally mentions that scrap aluminum may be used to provide the aluminum component of the reducing agent. Avery's U.S. Pat. Nos. 3,698,888 and 3,761,247 describe uses of a reducing alloy containing 50 to 100% by weight silicon, 0 to 40% by weight aluminum and 0 to 15% by weight iron.

Some of the known processes employ reducing agents that are rich in aluminum. Thus, U.S. Pat. No. 3,782,922 of Avery describes a process which uses as a reducing agent aluminum or an aluminum alloy which contains at least 85% by weight aluminum. U.S. Pat. No. 4,033,759 and U.S. Pat. No. 4,066,445, both of Johnston et al., describe processes which use as a reducing agent aluminum having a purity of at least 80% by weight, and U.S. Pat. No. 4,033,758, also to Johnston et al., discloses a process utilizing an aluminum-silicon alloy as a reducing agent which contains from 15 to 75 wt.% aluminum.

Aluminum is a reactive metal, and it reacts at room temperature with a variety of acids, bases and other reagents. It is also quite reactive at the high temperatures required for the production of magnesium. As a matter of fact, aluminum is a more reactive reducing agent than silicon or ferrosilicon in a liquid state thermal reduction process for the production of magnesium, because it produces a higher vapor pressure of magnesium at a lower temperature. However, there are disadvantages to the use of aluminum as a reducing agent in such a process. Aluminum is generally more expensive than either silicon or ferrosilicon, and because of its high reactivity at high temperatures, aluminum can react not only with magnesium oxide, but also with the silicon dioxide in the molten oxide slag. This can result in the simultaneous production of magnesium, silicon monoxide and silicon, with the silicon appearing as an impurity in the magnesium product.

Accordingly, a commercially viable, low silicon thermal reduction process capable of using low-cost aluminum as a reducing agent would be most beneficial, if available.

SUMMARY OF THE INVENTION

An object of the present invention is to provide a thermal reduction process for the production of magnesium which utilizes a low-cost but highly reactive reducing agent. Another object of this invention is to provide such a process which may be operated without significant contamination of the magnesium product with silicon. A further object of this invention is to provide a process that recovers increased amounts of magnesium from magnesium oxide containing ores. Yet another object is to provide a more energy efficient process. Still yet another object of this invention is to provide a process having high magnesium production rates.

In accordance with these and other objects, the invention comprises a thermal reduction process for producing magnesium by a liquid state reaction in a reaction-condensation system having a reaction zone and a condensation zone. According to this process, a magnesium oxide containing slag disposed in the reaction zone is preferably contacted with a reducing agent containing ferrosilicon and at least 25 wt.% aluminum at a temperature maintained between 1300° to 1700° C. and at a pressure below 250 torr for purposes of producing magnesium vapor. The magnesium vapor is then transported from the reaction zone to the condensation zone where it is condensed and collected.

The slag is preferably maintained to contain from 3 to 6 wt.% magnesium oxide, from 9 to 25 wt.% aluminum oxide, and is characterized by a $CaO/SiO_2$ weight ratio that is no less than that provided by the formula $2.1 + 0.03$ (wt.% $Al_2O_3 - 9$) and no greater than that provided by the formula $2.45 + 0.13$ (wt.% $Al_2O_3 - 9$).

The slag is further characterized by having the ability to decrepitate upon cooling.

The aluminum component of the reducing agent referred to above is preferably provided by using low-cost particles of aluminum skim or aluminum shot having a low dust content. The particles should have a size, weight and configuration such that when charged to the reaction zone, a substantial portion of the aluminum in the particles reacts or contacts the molten slag to produce magnesium vapor.

In order to facilitate an understanding of the invention, an apparatus in which the process may be practiced is illustrated in FIG. 1, and a detailed description of the process follows. It is not intended, however, that the invention be limited to the particular embodiments described or be used in connection with the apparatus shown. Various changes are contemplated such as would ordinarily occur to one skilled in the art to which the invention relates.

DESCRIPTION OF THE PREFERRED EMBODIMENTS

Figure 1:
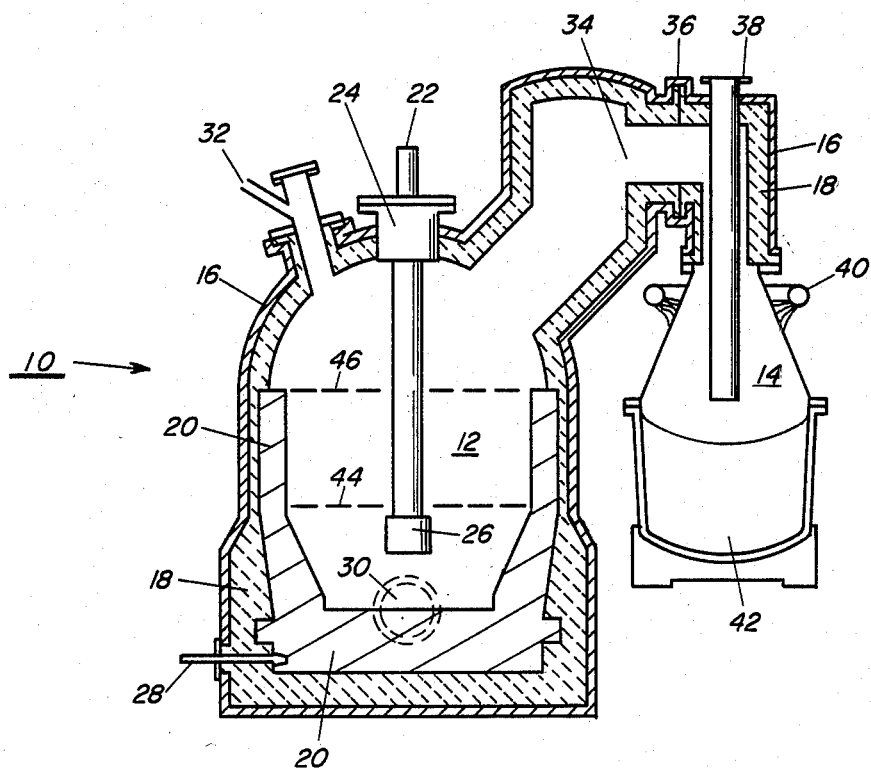
FIG. 1 is a schematic elevational cross section of an apparatus which may be used to produce magnesium by the process of the present invention.

As used herein, the term "aluminum skim" means the layer of oxides, with entrapped metal, which is formed on the surface of molten aluminum or aluminum alloys. The oxide portion of aluminum skim is typically formed from oxides introduced into the molten metal or from oxides generated on new metal surfaces exposed to the atmosphere during or after melting. Aluminum skim typically contains from 20 to 95 wt.% aluminum and from 5 to 80 wt.% aluminum oxide. It may also contain small amounts of substances such as magnesium, manganese, magnesium oxide, iron, silicon, copper, sodium and zinc, especially when obtained from aluminum alloys containing such substances. Sand, glass and clay or furnace refractories are also often found in the skim, such as when the skim is that of recycled beverage container scrap.

If skim is employed as the aluminum reducing component in the process of the present invention, it is important in producing ASTM grade magnesium that substances present in the skim, such as manganese, sodium, zinc, other high vapor pressure substances and, surprisingly, copper, not exceed certain limits. These substances are troublesome under process conditions because they tend to vaporize, transport and condense with the magnesium vapor, thereby contaminating the magnesium produced. The levels of contaminants which can be tolerated by the present process to produce ASTM grade magnesium will be discussed in more detail, infra. In any event, skim having acceptable levels of contaminants can generally be prepared by blending skim known to have high levels of contaminants with skim known to have low levels of contaminants. For example, it is known that skim of Aluminum Association 7000 Series Alloys is too heavily contaminated with zinc to produce ASTM specification magnesium. Therefore, such skim should not be used in the process of the present invention unless it can be mixed or blended with skim containing low levels of zinc. Similarly, since the skim of Aluminum Association 3000 Series Alloys generally contains high levels of manganese, it should be avoided unless it can be blended or mixed with low manganese skim.

Skim particles, in accordance with the present invention, should preferably have a low dust content. Skim dust presents a magnesium contaminant problem because it tends to remain suspended above the agitating molten slag after charging thereto and, as such, has a tendency to become entrained in the magnesium vapor escaping from the slag. As a result, the dust is carried over to the condenser where it collects with the magnesium vapor, thereby contaminating the magnesium produced. It has been found that screening is an effective way of removing dust from the skim and that skim particles large enough to be retained by an 8-mesh (Tyler Series) screen are generally heavy enough to fall through the escaping magnesium vapor, make contact with the slag and react therewith. In addition, treating or washing skim particles with water during screening or subsequent thereto has been found to result in even greater dust removal.

"Aluminum shot" as used herein means semispherical, substantially pure aluminum pellets having a weight similar to that required for skim particles, i.e. heavy enough to contact and react with the molten slag upon being charged to the reaction zone. In contrast to skim particles, however, aluminum pellets, because of their greater density, can be somewhat smaller than the skim particles. In a preferred embodiment, the pellets generally range from about $\frac{3}{8}$ inch to $\frac{1}{8}$ inch in diameter.

The pellets, as preferably contemplated herein, are prepared from a low-cost source of aluminum such as aluminum scrap or aluminum skim. If the source is skim, the free aluminum contained therein is what the pellets are made from. Accordingly, to make aluminum shot from skim, the free aluminum in the skim must first be separated from the aluminum oxides contained therein. Those skilled in the art will be familiar with numerous processes for such separation. One process found to be suitable involves the use of salt fluxes wherein a rotary barrel salt furnace, such as that described in U.S. Pat. No. 3,468,524 to C. W. Haack, is charged with rock salt or another halide skim flux. The salt is melted to form a molten salt slag. Skim is then added and, after a period of time, the salt will wet the aluminum oxide contained in the skim causing the molten free aluminum to coalesce or collect in the bottom of the furnace, thereby permitting it to be tapped from the furnace.

One process for forming molten aluminum into pellets, whether obtained from skim, as described above, or by melting scrap aluminum, involves feeding molten aluminum into troughs which feed into drop pans, each pan bottom being perforated with several 0.1-inch holes. The pans are positioned on a frame which is vigorously vibrated with a mechanical hammer assembly. The molten aluminum poured into the pans forms into droplets as it falls through the holes. The molten droplets fall into a water-filled pit where, upon contact with the water, they quickly solidify to take their final pellet shape. A bucket conveyor may then be employed to constantly lift the pellets from the bottom of the water pit and feed them into a gas-fired, horizontal rotary dryer. When dry, the pellets, now referred to as shot, are ready for charging to the reaction zone of the present process for producing magnesium. Shot produced as described has a nonfriable, smooth surface which makes it extremely resistant to dust formation, which might otherwise result from handling or transporting the shot or upon charging the shot into the reaction zone of the present process for producing magnesium.

As with skim, to produce ASTM grade magnesium, the aluminum shot must not contain troublesome levels of high vapor pressure substances. These levels will be discussed in more detail, infra.

Referring now to FIG. 1, an apparatus 10 for producing magnesium by a thermal reduction process is illustrated. Apparatus 10 comprises a reaction-condensation system having a reaction zone 12 and a condensation zone 14. Reaction zone 12 is bounded by an outer steel sheel 16. Inside this shell is a thermally insulating refractory lining 18 and an internal carbon lining 20. Electrode 22, preferably of copper and water-cooled, extends through electrically insulating sleeve 24 into the reaction zone. At the lower end of electrode 22 is graphite cylinder 26. Carbon lining 20 serves as the hearth electrode, and embedded in this lining is current lead 28, which is suitably insulated from contact with steel shell 16. In the lower part of the reaction zone is tap hole 30, which is used to remove residual slag from the reaction zone. This tap hole is tightly closed when the system is in operation. In the upper part of the reaction zone is inlet 32, through which the reducing mixture and the magnesium oxide ore are introduced into the reaction zone.

Tuyere 34 serves as the passage through which magnesium vapors produced in the reaction zone are conducted to the condensation zone. Flange connector 36, which is adapted to be cooled by circulating water, connects reaction zone 12 to condensation zone 14. The upper portion of condensation zone 14 is bounded by a continuation of steel shell 16 and thermally insulating refractory lining 18. In the upper portion of the condensation zone are located vacuum pump inlet pipe 38 and water spray cooler 40. Inlet pipe 38 provides access to the reaction-condensation system for maintaining and controlling the desired pressure conditions therein. Cooler 40 serves to cool the condensation zone to facilitate condensation of the magnesium vapors therein. In the lower portion of the condensation zone is located crucible 42, where condensed magnesium is collected.

The present invention may be carried out in a reaction-condensation system such as apparatus 10. In carrying out this process, a molten oxide slag is provided and maintained in the reaction zone. The reducing mixture and the magnesium oxide containing ore may be mixed together and melted in the reaction zone to form a slag of the desired composition, or a suitable slag from a previous operation may be used.

A suitable slag may be formed by charging to the reaction zone and melting therein an ore containing from 45 to 65 wt.% calcium oxide and from 25 to 60 wt.% magnesium oxide and a reducing agent comprised of a mixture of ferrosilicon and at least 25 wt.% aluminum. Since aluminum is rather expensive, the aluminum component of the reducing agent is preferably provided by using low-cost particles of aluminum skin or shot (defined, supra), both, preferably, having a low dust content. Low dust content, as previously mentioned, is advantageous in that it minimizes transport or carryover of dust to the condensation zone by the magnesium vapor produced in the reaction zone.

An ore having the above-mentioned composition and providing good results is calcined dolomite, and preferred results may be obtained when the calcined dolomite has the formula CaO.xMgO, where $0.5 \leq x \leq 2.0$. Even better results may be obtained when the ore contains from 55 to 60 wt.% calcium oxide and 35 to 45 wt.% magnesium oxide. If skim is employed as the aluminum component of the reducing agent, it has been found that preferred results can be obtained by employing a reducing mixture comprised of 50 to 75 wt.% ferrosilicon and 25 to 50 wt.% aluminum skim wherein the ferrosilicon component contains 60 to 80 wt.% silicon and the aluminum skim component contains 70 to 95 wt.% aluminum, the balance consisting essentially of aluminum oxide. If shot is used as the aluminum component of the reducing agent, it has been found that preferred results can be obtained by a reducing agent containing from about 30 to 40 wt.% aluminum shot and from about 60 to 70 wt.% ferrosilicon.

As mentioned previously, it is desirable that the aluminum component of the reducing agent have low levels of high vapor pressure substances. Zinc, copper and manganese have been found particularly troublesome. Preferably, the aluminum component, whether shot or skim, should contain no more than 0.35 wt.% zinc, 2 wt.% manganese and 3 wt.% copper. In addition, it is particularly desirable that the skim contain as little aluminum carbide and aluminum nitride as possible. Preferably, the skim should contain no more than 0.5 wt.% aluminum carbide and no more than 0.5 wt.% aluminum nitride. Although it is not known exactly what effect the presence of these compounds has on the reaction, it is believed the aluminum dissociates from the nitrogen and the carbon in the reaction zone and forms oxides of carbon and nitrogen which are then transported to the condensation zone with the magnesium vapor where back reaction occurs consuming Mg and producing MgO and nitrides.

Returning now to operational considerations with the apparatus illustrated in FIG. 1, it should be noted that the amount of slag maintained in reaction zone 12 should be controlled so graphite cylinder 26 at the lower end of anode 22 is submerged. Such control can be provided by introducing additives through inlet 32 and removing or tapping excess slag through tap hole 30. Numerals 44 and 46 indicate the minimum and maximum levels between which the slag should be maintained.

During operation of the process, the composition of the slag is controlled by periodic or continuous addition of ore and reducing mixture. Depending on the composition of these additives, it may be desirable to add quartzite or some other source of silicon dioxide as well, in order to maintain the silicon dioxide concentration of the slag within the desired range. Generally, no other additives will be required.

Good results can be obtained by maintaining the composition of the slag to contain from 50 to 63 wt.% calcium oxide, 13 to 28 wt.% silicon dioxide, 9 to 25 wt.% aluminum oxide and 1 to 8 wt.% magnesium oxide. More importantly, however, a significant aspect of the present invention involves maintaining the slag with a relatively high $CaO/SiO_2$ weight ratio; however, not so high as to cause the slag to lose its ability to decrepitate upon cooling. "Decrepitate" as used herein refers to a crackling or fragmenting of the slag material which occurs upon cooling. Such behavior is apparently caused by volume changes in the slag material which apparently occur as a result of phase changes taking place during cooling. Such is advantageous in that it facilitates quick removal of cooled residual slag adhering to tapping troughs and ladles. The fragmenting slag actually frees itself or "de-adheres" from the surfaces of the tapping troughs and ladles. Since nondecrepitating slag does not fragment, it is difficult to remove from ladle and trough surfaces. It is also troublesome because it tends to be more viscous than decrepitating slag which slows tapping and concomitantly reduces the magnesium production rate. Nondecrepitating slag also solidifies are freezes (due to a higher melting point) much quicker than decrepitating slag, thereby further slowing tapping and lowering the magnesium production rate. Because of this characteristic, nondecrepitating slag is also referred to herein as quick-chill slag. Another problem encountered with nondecrepitating slag and primarily attributed to its highly viscous nature is the slow rate at which it dissolves reactant raw materials, i.e. magnesium oxide containing ores and reducing agents.

Figure 2:
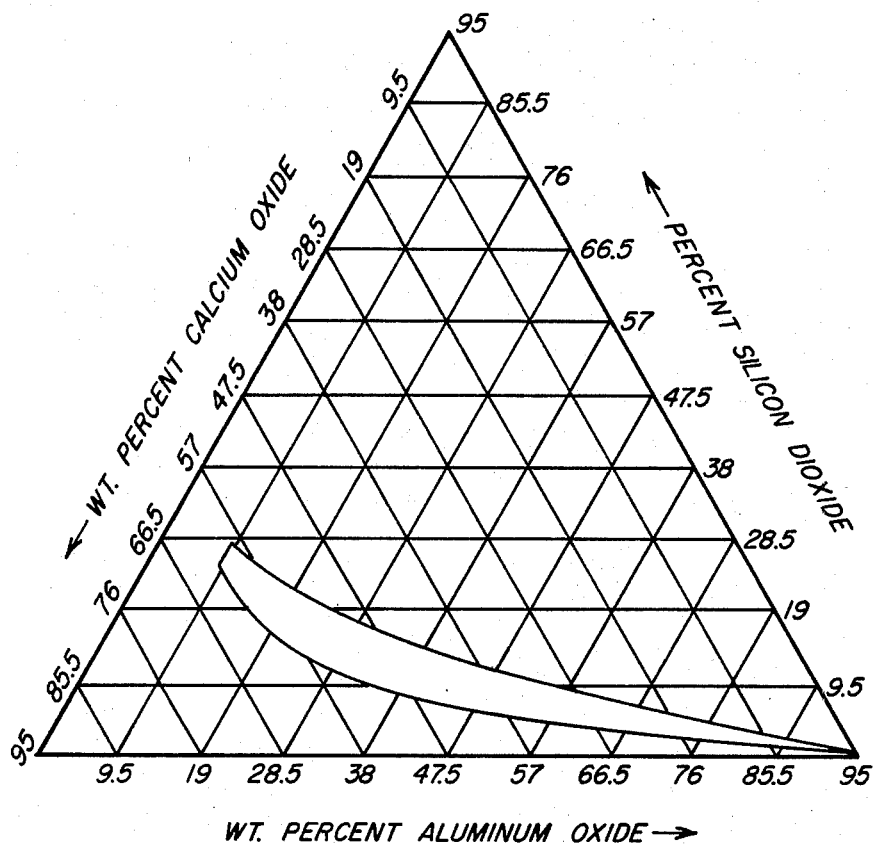
FIG. 2 is a three-component graph showing the preferred concentrations of calcium oxide, aluminum oxide and silicon dioxide in the slag at 5 wt.% magnesium oxide.

On a positive note, however, nondecrepitating slag has been found to produce magnesium having relatively low levels of silicon contamination. It was this discovery that led to the postulation that decrepitating slag having high $CaO/SiO_2$ ratios which are near the boundary separating decrepitating from nondecrepitating slags should also produce magnesium having relatively low concentrations of silicon. This belief was confirmed by actual test data. Accordingly, an important aspect of the invention involves maintaining the $CaO/SiO_2$ ratio as close as possible to the boundary separating decrepitating and nondecrepitating slags. It has been found that this can be accomplished by maintaining the $CaO/SiO_2$ ratio above that provided by the formula $2.1+0.03$ (wt.% $Al_2O_3$—9) and below that provided by the formula $2.45+0.13$ (wt.% $Al_2O_3$—9). The slag, as defined by these formulas at 5 wt.% MgO, is illustrated in FIG. 2. The second formula, i.e. $2.45+0.13$ (wt.% $Al_2O_3$—9) approximates the boundary separating decrepitating slags from nondecrepitating slags and is illustrated in FIG. 2 as the lower line. Thus, slags below this line or boundary in FIG. 2 are believed to be quick-chill, nondecrepitating slags. Those skilled in the art will appreciate the fact that the above formulas are based upon the surprising recognition that increased amounts of alumina in the slag require maintenance of higher $CaO/SiO_2$ weight ratios for optimum process performance.

Preferred process operation (i.e. operation without fear of accidentally slipping into troublesome nondecrepitating slags) can be obtained by maintaining the slag approximately within the limits provided by the formula $2.25 \pm 0.05 + 0.05$ (wt.% $Al_2O_3$—9). MgO concentration in the slag is also preferably maintained from about 3 to 6 wt.% and $Al_2O_3$ concentration is preferably maintained from about 10 to 17 wt.%.

During operation of the process, the temperature in the reaction zone should be maintained between 1300° and 1700° C., preferably within the range of 1500° to 1600° C. The absolute pressure within the reaction zone should be maintained below 250 torr. It is preferred that the pressure be maintained within the range of 35 to 95 torr. Optimum results are obtained when the pressure in the reaction zone is maintained at about 70 torr.

When the process is carried out as has been described herein, the reducing agent reacts in the reaction zone of the system with the slag or with magnesium oxide in the presence of the slag to produce magnesium vapor. This vapor is evolved from the surface of the slag and transported to the condensation zone of the system, where it is condensed and collected. An inert gas such as argon or hydrogen may be used to prevent air from contacting the magnesium. As the reaction proceeds, the slag level in the reaction zone increases. From time to time, a portion of the slag and any unreacted components of the reducing mixture, such as iron, are removed through tap hole 30.

For purposes of illustrating the process utilizing skim and the process utilizing aluminum shot, and to compare their operation with that of the Magnetherm Process and a process utilizing quick-chill, nondecrepitating slag, a production facility unit was operated for one week with aluminum skim, for one week with aluminum shot and for one week with nondecrepitating quick-chill slag. The production facility unit utilized consisted of a reaction-condensation system substantially similar to that illustrated by the drawing. The comparative data for the Magnetherm Process, which utilizes ferrosilicon as a reducing agent, was generated by a similar production facility unit.

Table I shows an analysis of samples of aluminum skim utilized in the skim test. Table II shows an analysis of the ferrosilicon used in all tests. Table III shows an analysis of the dolime used in all tests. The reducing mixture used in the skim test contained 60 to 75 wt.% ferrosilicon and 25 to 40 wt.% aluminum skim. During the skim test, slag samples were taken and analyzed, and the compositional range therefor is set forth in Table IV. Slag samples were also taken during the shot and quick-chill process tests, and analysis showed $Al_2O_3$ concentrations ranging from 8 to 15 wt.% and MgO concentrations ranging from 1 to 8 wt.%. The shot and quick-chill tests resulted in the discovery of the relationship between alumina content and the $CaO/SiO_2$ weight ratio. Table V sets forth a comparison of result averages obtained from the tests for the invention using skim, the invention using shot, the Magnetherm Process and a similar process also using shot but having or utilizing a nondecrepitating (quick-chill) slag. As can be seen therein, the inventive skim and shot processes recovered significantly more magnesium from the magnesium containing ore than did either the Magnetherm Process or the process utilizing a nondecrepitating, quick-chill slag. It can also be seen therein that the skim and shot processes are significantly more energy efficient than the Magnetherm Process (see power consumption data). Power consumption data for the process utilizing quick-chill nondecrepitating slag could not be obtained because of frequent system downtime due to operational difficulties with the highly viscous, nondecrepitating slag. With regard to silicon contamination, it can be seen that while the process utilizing nondecrepitating slag results in low silicon contamination, the inventive skim and shot processes produce magnesium having significantly lower silicon contamination than that produced by the Magnetherm Process. Most significantly, however, are the higher magnesium production rates obtained with the inventive skim and shot processes. As can be seen in the last line of Table V, both the skim and shot processes, particularly the shot process, result in magnesium production rates which are significantly higher than those obtained with either the Magnetherm Process or the process utilizing nondecrepitating (quick-chill) slag.

TABLE I

| Analysis of Aluminum Skim | |
|---|---|
| I. Particle Size: | $-1\frac{1}{4}''$ + 8 mesh |

TABLE I-continued

Analysis of Aluminum Skim

II. Loss on Ignition: .05 to .5% by weight
III. Chemical Composition (by weight)
  A. Metals

| | |
|---|---|
| Aluminum: | 50 to 95% |
| Magnesium: | 1.0 to 5.0% |
| Manganese: | .2 to 1.0% |
| Copper: | .1 to .5% |
| Zinc: | .01 to .10% |

B. Oxides

| | |
|---|---|
| Aluminum Oxide: | 3 to 45% |
| Magnesium Oxide: | 0 to 10% |
| Others: | 0 to 5% |

C. Other Compounds

| | |
|---|---|
| Aluminum Carbide: | .1 to .3% |
| Carbon (not in the form of carbides): | .1 to .4% |

TABLE II

Analysis of Ferrosilicon

I. Particle Size: $-1\frac{1}{4}'' \times 0$
II. Loss on Ignition: <0.05%
III. Chemical Composition — Range (by weight)

| | |
|---|---|
| Silicon: | 70 to 78% |
| Iron: | 18 to 25% |
| Aluminum: | 0 to 6% |
| Carbon: | 0 to 1% |
| Calcium: | 0 to 1% |

TABLE III

Analysis of Dolime

I. Particle Size: $-1\frac{3}{4}'' + 5/16''$
II. Average Loss on Ignition: 0.015% by weight
III. Chemical Composition — Range (by weight)

| | |
|---|---|
| Calcium Oxide: | 55 to 60% |
| Magnesium Oxide: | 37 to 41% |
| Silicon Dioxide: | 1 to 5% |
| Aluminum Oxide: | 0 to 1% |
| Ferric Oxide: | 0 to 1% |

TABLE IV

Slag Composition

| Oxide | Range (by weight) |
|---|---|
| Calcium Oxide: | 50.7 to 61.2% |
| Silicon Dioxide: | 15.4 to 27.0% |
| Aluminum Oxide: | 9.8 to 16.3% |
| Magnesium Oxide: | 4.4 to 8.8% |

TABLE V

[Comparative Results (Averages)]

| | Invention Using Al Skim | Invention Using Al Shot | Magnetherm Process | Process Utilizing Nondecrepitating (Quick-Chill) Slag |
|---|---|---|---|---|
| Amount of Aluminum Shot Charged | — | .38 lb/lb Mg produced | — | .31 lb/lb Mg produced |
| Amount of Aluminum Skim Charged | 0.4 lb/lb Mg produced | — | — | — |
| Amount of Ferrosilicon Charged | 0.89 lb/lb Mg produced | .67 lb/lb Mg produced | 1.07 lb/lb Mg produced | .82 lb/lb Mg produced |
| Amount of Dolime Charged | 5.85 lb/lb Mg produced | 5.7 lb/lb Mg produced | 6.33 lb/lb Mg produced | 6.3 lb/lb Mg produced |
| Amount of Alumina Charged (other than in skim) | — | — | 0.86 lb/lb Mg produced | — |
| Amount of Quartz Charged | — | .26 lb/lb Mg produced | — | — |
| Rate of Magnesium Product Recovered from Dolime Charge | 71.0% | 72.3% | 64.8% | 65.7% |
| Power Utilized to Produce Magnesium | 4.02 kWh/lb Mg produced | 3.77 kWh/lb Mg produced | 4.48 kWh/lb Mg produced | (data not available) |
| Average Silicon Content of Product | .095% by weight | .10% by weight | 0.12% by weight | 0.066% by weight |
| Dolime per Cycle | 88,614 lbs/ 20 hr cycle | 90,600 lbs/ 18 hr cycle | 92,240 lbs/ 20 hr cycle | 83,000 lbs/ 20 hr cycle |
| Mg Production Rate | 757 lbs Mg/hr | 883 lbs Mg/hr | 728 lbs Mg/hr | 659 lbs Mg/hr |

The inventive embodiments, as described herein, are susceptible to various modifications and adaptations, and the same are intended to be comprehended within the meaning and range of equivalents of the appended claims.

What is claimed is:

1. An improved process for the recovery of increased amounts of magnesium having low silicon contamination from a magnesium oxide containing ore, the process occurring in a system having a reaction zone and a condensation zone, the process comprising the steps of:
   (a) charging to the reaction zone an ore containing 45 to 65% by weight calcium oxide and 25 to 60% by weight magnesium oxide and a reducing agent containing ferrosilicon and at least 25 wt.% aluminum skim;
   (b) providing a molten calcium-silicon-aluminum-magnesium oxide slag in the reaction zone;
   (c) contacting the reducing mixture with the slag or with magnesium oxide in the presence of the slag in the reaction zone at a temperature within the range of 1300° to 1700° C. and a pressure of between 35 and 100 torr to produce magnesium vapor;
   (d) transporting the magnesium vapor from the reaction zone to the condensation zone; and
   (e) condensing the magnesium vapor in the condensation zone.

2. The process of claim 1 wherein the ore is in the form of calcined dolomite of the formula CaO.xMgO where $0.5 \leq x \leq 2.0$.

3. The process of claim 1 wherein the ore contains 55 to 60% by weight calcium oxide and 35 to 45% by weight magnesium oxide.

4. The process of claim 1 wherein the ferrosilicon contains 60 to 80% by weight silicon.

5. The process of claim 1 wherein the slag contains 50 to 63% by weight calcium oxide, 13 to 28% by weight silicon dioxide, 9 to 25% by weight aluminum oxide and 1 to 8% by weight magnesium oxide.

6. The process of claim 1 wherein the aluminum skim contains 20 to 95% by weight aluminum and 5 to 80% by weight aluminum oxide.

7. The process of claim 1 wherein the aluminum skim contains no more than 0.5% by weight aluminum carbide and no more than 0.5% by weight aluminum nitride.

8. The process of claim 1 wherein the aluminum skim contains no more than 0.35 wt.% zinc.

9. The process of claim 1 wherein the aluminum skim contains no more than 2 wt.% manganese.

10. The process of claim 1 wherein the aluminum skim contains no more than 3 wt.% copper.

11. The process of claim 1 wherein the aluminum skim contains from 70 to 95 wt.% aluminum, the balance consisting essentially of aluminum oxide.

12. The process of claim 1 wherein the temperature is within the range of 1500° to 1600° C.

13. The process of claim 1 wherein the pressure is within the range of 35 to 95 torr.

14. The process of claim 1 wherein the pressure is about 70 torr.

15. The process of claim 1 wherein the reducing agent contains 50 to 75% by weight ferrosilicon and 25 to 50% by weight aluminum skim.

16. An improved process for the recovery of increased amounts of magnesium having low silicon contamination from a magnesium oxide containing ore, the process occurring in a system having a reaction zone and a condensation zone, the process comprising the steps of:
  (a) contacting a slag in said reaction zone at a temperature between 1300° and 1700° C. and at a pressure between 35 and 100 torr with a reducing agent containing ferrosilicon and at least 25 wt.% aluminum skim, the reducing agent contacting the slag to produce magnesium vapor, the slag having a composition containing 50 to 63% by weight calcium oxide, 13 to 28% by weight silicon dioxide, 9 to 25% by weight aluminum oxide and 1 to 8% by weight magnesium oxide;
  (b) removing the magnesium vapor from the reaction zone to the condensation zone for purposes of condensing the magnesium.

17. The process of claim 16 wherein the slag contains no more than 25 wt.% $Al_2O_3$.

18. The process of claim 16 wherein the slag contains from about 3 to 6 wt.% MgO.

19. The process of claim 16 wherein the slag contains from about 10 to 17 wt.% $Al_2O_3$.

20. The process of claim 16 wherein the ferrosilicon contains 60 to 80% by weight silicon.

21. The process of claim 16 wherein the aluminum skim contains no more than 0.5 wt.% aluminum carbide and no more than 0.5 wt.% aluminum nitride.

22. The process of claim 16 wherein the aluminum skim contains no more than 0.35 wt.% zinc.

23. The process of claim 16 wherein the aluminum skim contains no more than about 2 wt.% manganese.

24. The process of claim 16 wherein the aluminum skim contains no more than about 3 wt.% copper.

25. The process of claim 16 wherein the temperature is maintained within the range of 1500° to 1600° C.

26. The process of claim 16 wherein the pressure is maintained within the range of 35 to 95 torr.

27. The process of claim 16 wherein the pressure is maintained at about 70 torr.

28. The process of claim 16 wherein the reducing agent contains 25 to 50% by weight aluminum skim and 50 to 75% by weight ferrosilicon.

29. The process of claim 16 wherein the aluminum skim has a low dust content and a weight, size and configuration such that when charged to the reaction zone substantially all of said shot will contact and react with said molten slag, thereby minimizing carry-over of dust to the condensation zone by magnesium vapor produced in the reaction zone.

30. The process of claim 29 wherein the aluminum skim is of a size such that it will not pass through an 8-mesh Tyler Series screen.

31. The process of claim 16 further comprising the step of treating the skim with water for purposes of removing dust particles.

* * * * *